(12) United States Patent
Korenaga et al.

(10) Patent No.: US 8,813,730 B2
(45) Date of Patent: Aug. 26, 2014

(54) CONTROL APPARATUS FOR INTERNAL COMBUSTION ENGINE

(75) Inventors: Shingo Korenaga, Susono (JP); Shigeki Miyashita, Susono (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 0 days.

(21) Appl. No.: 13/514,475

(22) PCT Filed: Jun. 22, 2011

(86) PCT No.: PCT/JP2011/064223
§ 371 (c)(1),
(2), (4) Date: Jun. 7, 2012

(87) PCT Pub. No.: WO2012/176286
PCT Pub. Date: Dec. 27, 2012

(65) Prior Publication Data
US 2014/0102427 A1    Apr. 17, 2014

(51) Int. Cl.
*F02M 25/07* (2006.01)
*F02M 25/00* (2006.01)

(52) U.S. Cl.
USPC .................................. 123/568.12; 123/41.34

(58) Field of Classification Search
USPC ........... 123/568.12, 559.1, 563, 41.34, 41.48, 123/41.56; 701/108; 60/605.1, 605.2, 278, 60/280
See application file for complete search history.

(56) References Cited

U.S. PATENT DOCUMENTS

| 6,742,506 | B1 | 6/2004 | Grandin |
| 7,650,753 | B2 * | 1/2010 | Muller et al. ................... 60/599 |
| 2007/0028902 | A1 | 2/2007 | Nigoro et al. |
| 2011/0210125 | A1 * | 9/2011 | Kardos et al. ................. 220/502 |

FOREIGN PATENT DOCUMENTS

| JP | 59-068545 | A | 4/1984 |
| JP | 2002-147292 | A | 5/2002 |
| JP | 2003-503626 | A | 1/2003 |
| JP | 2004-308613 | A | 11/2004 |
| JP | 2007-040141 | A | 2/2007 |
| JP | 2009-121393 | A | 6/2009 |
| JP | 2009-191678 | A | 8/2009 |
| JP | 2009-287435 | A | 12/2009 |
| JP | 2010-174647 | A | 8/2010 |
| JP | 2011-007139 | A | 1/2011 |
| JP | 2011-099335 | A | 5/2011 |

* cited by examiner

*Primary Examiner* — Mahmoud Gimie
(74) *Attorney, Agent, or Firm* — Sughrue Mion, PLLC

(57) ABSTRACT

Provided is a control apparatus for an internal combustion engine, which can introduce external EGR gas during a cold condition, while favorably suppressing an occurrence of condensed water from the EGR gas. A twin entry type turbo supercharger (18) is provided. A first exhaust passage (14a) through which first exhaust gas exhausted from a first cylinder group (#2 and #3) and a second exhaust passage (14b) through which second exhaust gas exhausted from a second cylinder group (#1 and #4) are provided. A sub cooling system including a sub cooling passage (32) for cooling the first exhaust passage (14a) is provided. A main cooling system including a main cooling passage (30) for cooling the second exhaust passage (14b) is provided. An EGR passage (24) connected between the first exhaust passage (14a) and an intake passage (12), and an EGR valve (26) playing a role in opening and closing the EGR passage (24) are provided. The circulation of sub cooling water in the sub cooling system is stopped when EGR gas is introduced into the intake passage (12) during the cold condition.

8 Claims, 4 Drawing Sheets

100, 108  During cold condition?
102  Stop circulation of sub cooling water
104  Sub cooling water temperature > Predetermined value?
106  Execute circulation of sub cooling water
110  Control flow rate of sub cooling water

CONTROL APPARATUS FOR INTERNAL COMBUSTION ENGINE

CROSS REFERENCE TO RELATED APPLICATION

This application is a National Stage of International Application No. PCT/JP2011/064223, filed on Jun. 22, 2011, the contents of all of which are incorporated herein by reference in their entirety.

TECHNICAL FIELD

The present invention relates to a control apparatus for an internal combustion engine, and more particularly to a control apparatus for an internal combustion engine which is suitable as an apparatus controlling an internal combustion engine equipped with two types of first and second exhaust cooling means for cooling two types of first and second exhaust passages, respectively.

BACKGROUND ART

So far, for example, Patent Document 1 discloses a control apparatus for an internal combustion engine including a supercharger. The conventional control apparatus includes: a first exhaust passage that is communicated with a turbine of the supercharger; a second exhaust passage that is not communicated with the turbine; an EGR passage that connects a portion on an upstream side of the turbine in the first exhaust passage with an intake passage; a communication passage that connects some point of the EGR passage with the second exhaust passage; and an EGR cooler. The above described internal combustion engine is arranged such that a part of exhaust gas flowing through the first exhaust passage is introduced into the second exhaust passage via the EGR passage and the connection passage during a cold condition.

Including the above described document, the applicant is aware of the following documents as a related art of the present invention.

CITATION LIST

Patent Documents

Patent Document 1: Japanese Laid-open Patent Application Publication No. 2009-191678
Patent Document 2: Japanese Laid-open Patent Application Publication No. 2010-174647

SUMMARY OF INVENTION

Technical Problem

In an internal combustion engine including an EGR passage connected between an exhaust passage and an intake passage, it is generally considered not to perform a control to allow exhaust gas (EGR gas) to flow back into the intake passage via the EGR passage (so-called, external EGR control) during a cold condition, from viewpoints of suppression of deterioration of combustion and the like. However, from a viewpoint of improvement of fuel consumption caused by a decrease in pumping loss, it is considered to perform the external EGR control also during the cold condition.

However, if the external EGR control is performed during the cold condition, condensed water becomes easy to be generated from the EGR gas because the temperature of wall surfaces of passages (exhaust passage, EGR passage and intake passage) through which the EGR gas flows are low. If the EGR gas including a large quantity of the condensed water is taken into the cylinder, there is a concern that this could lead to deterioration of durability of the internal combustion engine.

The present invention has been made to solve the problem as described above, and has its object to provide a control apparatus for an internal combustion engine, which can introduce external EGR gas during a cold condition, while favorably suppressing an occurrence of condensed water from the EGR gas.

Solution to Problem

A first aspect of the present invention is a control apparatus for an internal combustion engine, comprising:
a first exhaust passage through which exhaust gas exhausted from a first cylinder subset made up of one or a plurality of cylinders flows;
a second exhaust passage through which exhaust gas exhausted from a second cylinder subset made up of one or a plurality of cylinders flows;
first exhaust cooling means which cools the first exhaust passage;
second exhaust cooling means which is provided separately from the first exhaust cooling means and cools the second exhaust passage;
an EGR passage which connects the first exhaust passage with an intake passage;
EGR control means which controls an EGR gas quantity introduced into the intake passage via the EGR passage; and
exhaust cooling adjustment means which when the EGR gas is introduced into the intake passage at a time of a cold condition of the internal combustion engine, reduces cooling capacity of the first exhaust passage by the first exhaust cooling means with respect to cooling capacity of the second exhaust passage by the second exhaust cooling means.

A second aspect of the present invention is the control apparatus for an internal combustion engine according to the first aspect of the present invention,
wherein the first exhaust cooling means is water-cooled cooling means for cooling the first exhaust passage by use of circulation of first cooling water, and
wherein the exhaust cooling adjustment means is means for stopping the circulation of the first cooling water by the first exhaust cooling means.

A third aspect of the present invention is the control apparatus for an internal combustion engine according to the first aspect of the present invention,
wherein the first exhaust cooling means is water-cooled cooling means for cooling the first exhaust passage by use of circulation of first cooling water,
wherein the second exhaust cooling means is water-cooled cooling means for cooling the second exhaust passage by use of circulation of second cooling water,
wherein the exhaust cooling adjustment means is means for reducing a circulation flow rate of the first cooling water with respect to a circulation flow rate of the second cooling water.

A fourth aspect of the present invention is the control apparatus for an internal combustion engine according to the second or third aspect of the present invention, further comprising:
water temperature excess increase suppression means which adjusts a circulation flow rate of the first cooling water such that a temperature of the first cooling water does not increase excessively in a case in which the EGR gas is introduced into the intake passage during the cold condition of the internal combustion engine.

A fifth aspect of the present invention is the control apparatus for an internal combustion engine according to any one of the first to fourth aspects of the present invention, wherein a surface area of the first exhaust passage is set larger than a surface area of the second exhaust passage.

A sixth aspect of the present invention is the control apparatus for an internal combustion engine according to any one of the first to fifth aspects of the present invention, further comprising:

twin entry type turbo supercharger which has a turbine operating by exhaust energy of the internal combustion engine, and is configured such that the exhaust gas from the first cylinder sub set and the exhaust gas from the second cylinder sub set are separately led to the turbine by means of the first exhaust passage and the second exhaust passage.

A seventh aspect of the present invention is the control apparatus for an internal combustion engine according to any one of the first to six aspects of the present invention, wherein the first exhaust cooling means is water-cooled cooling means that cools the first exhaust passage by use of the circulation of the first cooling water, and wherein the first cooling water is for cooling a water-cooled intercooler.

Advantageous Effects of Invention

According to the first aspect of the present invention, the cooling capacity of the first exhaust passage by the first exhaust cooling means is reduced with respect to the cooling capacity of the second exhaust passage by the exhaust cooling means when the EGR gas is introduced into the intake passage during the cold condition, in an internal combustion engine that includes two types of the first and second exhaust cooling means for two types of the first and second exhaust passages. As a result, the wall surface temperature of the first exhaust passage can be increased promptly as compared with a case in which the first exhaust passage is cooled during the cold condition without any special consideration. Thus, the temperature of the EGR gas that is flown into the EGR passage from the first exhaust passage can be increased. This makes it possible to reduce the quantity of condensed water that is flown into the cylinder as a result of suppressing an occurrence of the condensed water from the EGR gas. In this way, the present invention can introduce external EGR gas during the cold condition, while successfully suppressing the occurrence of the condensed water from the EGR gas.

According to the second aspect of the present invention, by the exhaust cooling adjustment means stopping the circulation of the first cooling water by the first exhaust cooling means, the cooling capacity of the first cooling passage by the first exhaust cooling means can be reduced with respect to the cooling capacity of the second exhaust passage by the second exhaust cooling means, during the cold condition.

According to the third aspect of the present invention, by the exhaust cooling adjustment means reducing the circulation flow rate of the first cooling water with respect to the circulation flow rate of the second cooling water, the cooling capacity of the first cooling passage by the first exhaust cooling means can be reduced with respect to the cooling capacity of the second exhaust passage by the second exhaust cooling means, during the cold condition.

According to the fourth aspect of the present invention, an appropriate temperature management for the first cooling water can be performed when the circulation of the first cooling water is stopped during the cold condition, or when the circulation flow rate of the first cooling water is reduced during the cold condition.

The fifth aspect of the present invention allows the wall surface temperature of the first exhaust passage to be easy to increase with respect to the wall surface temperature of the second exhaust passage, and can therefore promote an increase in temperature of the first cooling water during the cold condition. This makes it possible to achieve a hardware configuration capable of favorably suppressing the occurrence of the condensed water from the EGR gas that is flown into the EGR passage from the first exhaust passage side.

According to the sixth aspect of the present invention, the effects of the aforementioned first and fifth aspects of the present invention can be achieved in the twin entry type turbo supercharger that includes the two types of the first and second exhaust passages.

According to the seventh aspect of the present invention, the effects of the aforementioned first and sixth aspects of the present invention can be achieved in the internal combustion engine that includes another cooling system for the water-cooled intercooler separately from one for normal engine cooling water.

DESCRIPTION OF EMBODIMENT

First Embodiment

[System Configuration of First Embodiment]

Figure 1:
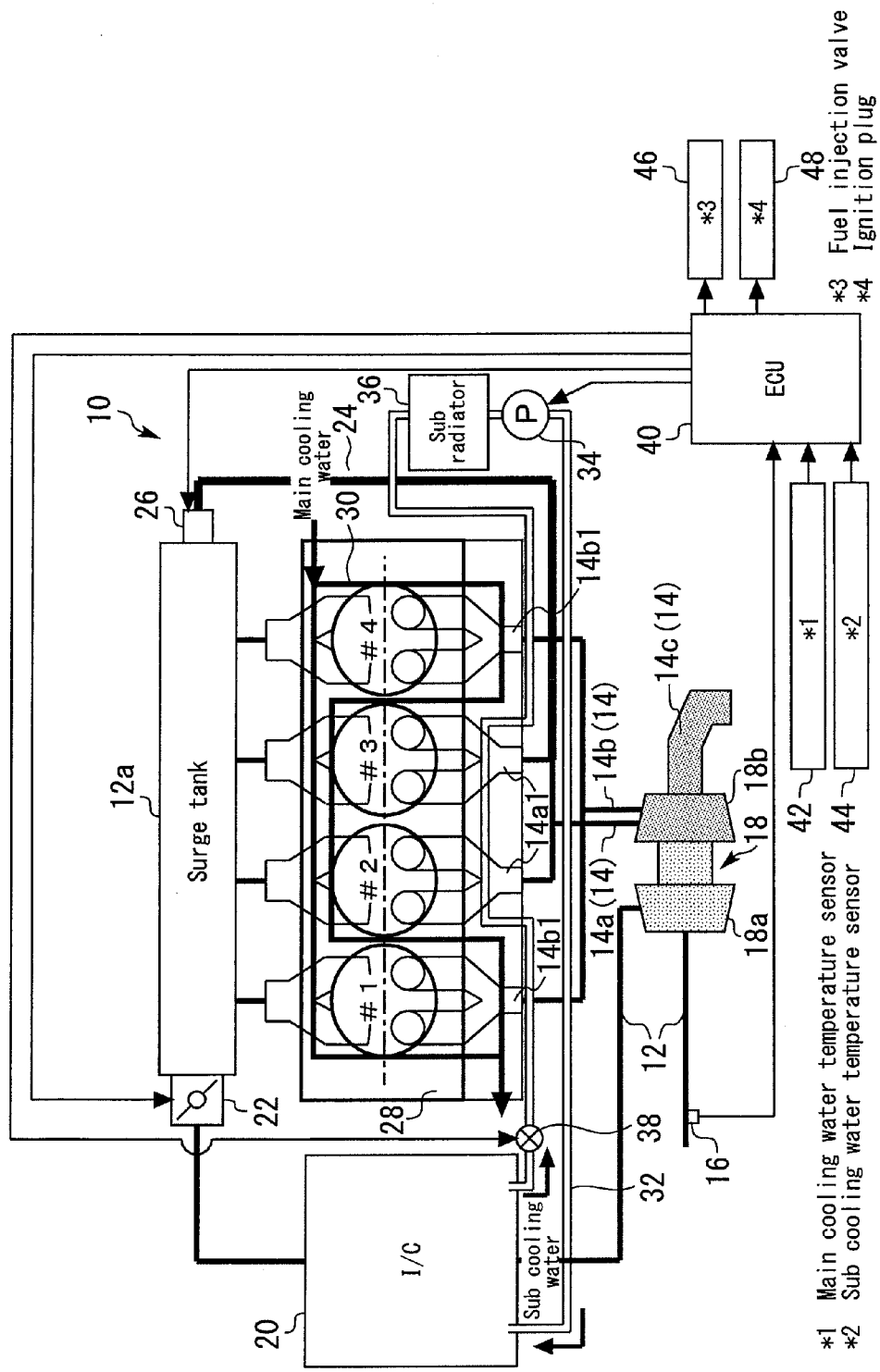
FIG. 1 is a diagram for explaining a system configuration of an internal combustion engine according to a first embodiment of the present invention.

FIG. 1 is a diagram for explaining a system configuration of an internal combustion engine 10 according to a first embodiment of the present invention. It is supposed herein that the internal combustion engine 10 is, as an example, a straight four-cylinder engine, and that the explosion sequence thereof is #1 to #3, to #4, and to #2. As shown in FIG. 1, the internal combustion engine 10 includes an intake passage 12 for taking air into cylinders, and an exhaust passage 14 through which exhaust gas exhausted from the cylinders flows.

The exhaust passage 14 includes: a first exhaust passage 14a through which an exhaust gas (hereinafter referred to as a "first exhaust gas") exhausted from a first cylinder sub set (hereinafter, referred to as a "first cylinder group") flows; a second exhaust passage 14b through which an exhaust gas (hereinafter referred to as a "second exhaust gas") exhausted from the remaining second cylinder sub set (hereinafter, referred to as a "second cylinder group" flows; and one confluent exhaust passage 14c after converging the first exhaust passage 14a and the second exhaust passage 14b. Moreover, in the present embodiment, the surface area of the first exhaust passage 14a is set to be smaller than that of the second exhaust passage 14b.

An air flow meter 16 is installed near the entrance of the intake passage 12 to output a signal representing the flow rate of the air taken into the intake passage 12. A compressor 18a of a turbo supercharger 18 is disposed downstream of the air flow meter 16. The turbo supercharger 18 includes a turbine 18b, which is integrally coupled with the compressor 18a and is operative by exhaust energy of the exhaust gas. The compressor 18a is rotatably driven by exhaust energy of the exhaust gas input to the turbine 18b.

In the intake passage 12 on the downstream side of the compressor 18a, a water-cooled intercooler 20 is disposed for cooling the air compressed by the compressor 18a. Further, an electronically controlled throttle valve 22 is installed downstream of the intercooler 20 to adjust the air quantity flowing through the intake passage 12.

The turbine 18b of the turbo supercharger 18 is installed at a confluent part between the first exhaust passage 14a and the second exhaust passage 14b, as shown in FIG. 1. As described above, the turbo supercharger 18 is a turbo supercharger which receives supplies of the first exhaust gas and the second exhaust gas from the aforementioned first cylinder group (#2 and #3) and the aforementioned second cylinder group (#1 and #4) independently with each other via the first exhaust passage 14a and the second exhaust passage 14b, that is, a so-called twin entry type (twin scroll type) turbo supercharger.

Moreover, one end of an EGR passage 24 is connected to the first exhaust passage 14a. The other end of this EGR passage 24 is connected to (a surge tank 12a of) the intake passage 12 on the downstream side of the throttle valve 22. In the vicinity of the end on the intake passage 12 side in the EGR passage 24, an EGR valve 26 is installed for opening and closing the EGR passage 24. According to such a configuration, a control to allow a part of the first exhaust gas flowing through the first exhaust passage 14a to flow back into the intake passage 12 via the EGR passage 24, that is, a so-called external EGR (Exhaust Gas Recirculation) control can be performed.

Further, the system of the present embodiment includes two types of exhaust cooling systems that are configured so as to be different between the first cylinder group (#2 and #3) and the second cylinder group (#1 and #4). Specifically, as shown in FIG. 1, there is formed inside a cylinder head 28, a main cooling water passage 30 through which normal engine cooling water (hereinafter, referred to as a "main cooling water") flows.

The main cooling water is arranged so as to be circulated, by a main water pump which is not shown, between a cooling water passage for predetermined cooling sites (for example, a cylinder block besides the cylinder head) of the internal combustion engine 10 as well as a main cooling water passage 30, and a main radiator (not shown) for cooling the main cooling water. As shown in FIG. 1, the main cooling water passage 30 runs inside the cylinder head 28 near a second exhaust port 14b1 of the second exhaust passage 14b on the second cylinder group side (#1 and #4). As a result of this, the second exhaust port 14b1 is cooled by the main cooling water.

On the other hand, a sub cooling water passage 32, through which a cooling water that is separate with respect to the aforementioned main cooling water and is for cooling the intercooler 20 (hereinafter referred to as a "sub cooling water") flows, runs inside the cylinder head 28 near a first exhaust part 14a1 of the first exhaust passage 14a on the first cylinder group side (#2 and #3). As shown in FIG. 1, the sub cooling water passage 32 is a passage for circulating the sub cooling water in the intercooler 20. Some points of the sub cooling water passage 32 are provided with a sub water pump 34 for circulating the sub cooling water, a sub radiator 36 for cooling the sub cooling water, and a flow rate control valve 38 for adjusting the flow rate of the sub cooling water that flows through the sub cooling water passage 32, respectively. With such a configuration, the first exhaust port 14a1 is cooled by the sub cooling water. Moreover, the above described two types of cooling systems are arranged such that a circulation flow rate of the sub cooling water is basically smaller than a circulation flow rate of the main cooling water which flows through the main cooling system the heat load of which is larger due to playing a main role in cooling the internal combustion engine 10.

Furthermore, the system shown in FIG. 1 includes an ECU (Electronic Control Unit) 40. There are connected to an input of the ECU 40, various sensors for detecting the operational state of the internal combustion engine 10, such as a main cooling water temperature sensor 42 for detecting the temperature of the main cooling water, and a sub cooling water temperature sensor 44 for detecting the temperature of the sub cooling water in the vicinity of the first exhaust port 14a1, as well as the air flow meter 16 described above. Moreover, there are connected to an output of the ECU 40, various actuators for controlling the operational state of the internal combustion engine 10, such as a fuel injection valve 46 for supplying a fuel to the internal combustion engine 10, and an ignition plug 48 for igniting a mixture gas, as well as the throttle valve 22, the EGR valve 26, the sub water pump 34 and the flow rate control valve 38, which are described above. The ECU 40 controls the operational state of the internal combustion engine 10 by actuating each actuator based on the output of each sensor and predetermined programs.

[Characteristic Control in First Embodiment]

In the exhaust gas exhausted from the internal combustion engine 10, a predetermined percentage of water is included in large quantity. Therefore, if the external EGR control is performed during a cold condition in an internal combustion engine having an EGR passage that connects an exhaust passage and an intake passage as in the above described internal combustion engine 10 of the present embodiment, condensed water from the EGR gas becomes easy to occur since the wall surface temperatures of passages (an exhaust passage, an EGR passage and an intake passage) through which the EGR gas flows are low.

Figure 2:
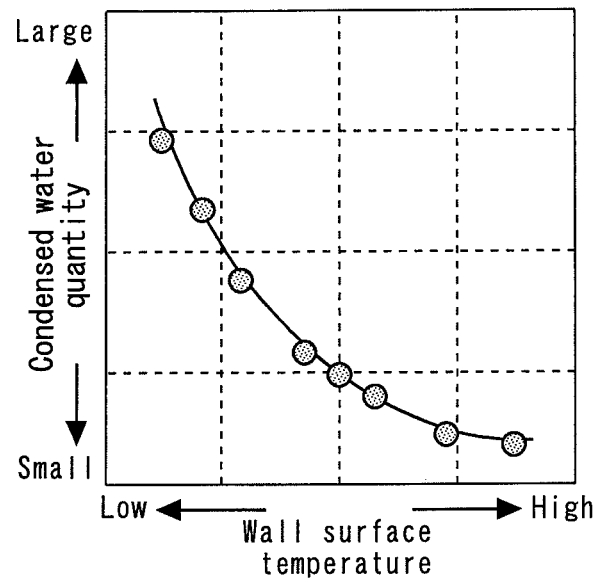
FIG. 2 is a diagram to represent a relation between condensed water quantity and wall surface temperature.
Figure 3:
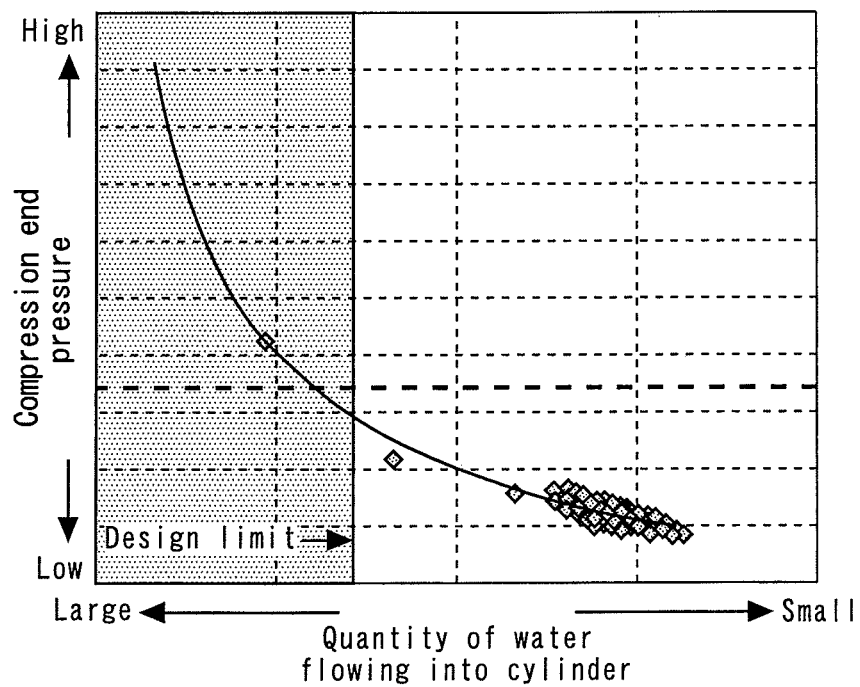
FIG. 3 is a diagram to represent a relation between in-cylinder pressure (compression end pressure) and quantity of water flowing into the cylinder.

FIG. 2 is a diagram to represent a relation between condensed water quantity and wall surface temperature. As the wall surface temperatures of the passages (the exhaust passage, the EGR passage and the intake passage) through which the EGR gas flows are lower, the generating quantity of the condensed water from the EGR gas increases more with the tendency as shown in FIG. 2. FIG. 3 is a diagram to represent a relation between in-cylinder pressure (compression end pressure) and quantity of water flowing into the cylinder. As the condensed water quantity flowing into the cylinder with the EGR gas increases, the compression end pressure increases with the tendency as shown in FIG. 3. The reason comes from the fact that since water which is liquid is hard to be compressed inside the cylinder, the volume of the air inside the cylinder decreases and the in-cylinder pressure increases accordingly. Therefore, in order to avoid durability of the internal combustion engine from being deteriorated by the EGR gas including a large quantity of condensed water being taken into the cylinder, as shown in FIG. 3, it is required to suppress the quantity of water flowing into the cylinder small within a range which does not exceed a design limit such that the compression end pressure becomes not too large.

Accordingly, in the present embodiment, an arrangement is made such that when the external EGR control is performed at the time of a cold condition of the internal combustion engine 10, the cooling capacity of the first exhaust passage 14a which plays a role in introduction of the EGR gas into the EGR passage 24 is lower than the cooling capacity of the remaining second exhaust passage 14b. Specifically, the circulation of the sub cooling water in the first exhaust passage 14a (first exhaust port 14a1) is stopped at the time of the cold condition.

Further, in the present embodiment, when the circulation of the sub cooling water in the first exhaust passage 14a is stopped at the time of the cold condition, an arrangement is made such that the circulation flow rate of the sub cooling water is adjusted so that the temperature of the sub cooling water in the vicinity of the first exhaust port 14a1 does not increase excessively. Specifically, when the temperature of the sub cooling water in the vicinity of the first exhaust port 14a1 is higher than a predetermined value during the stop of the circulation of the sub cooling water, the circulation of the sub cooling water is performed (the stop of the circulation is released).

Figure 4:
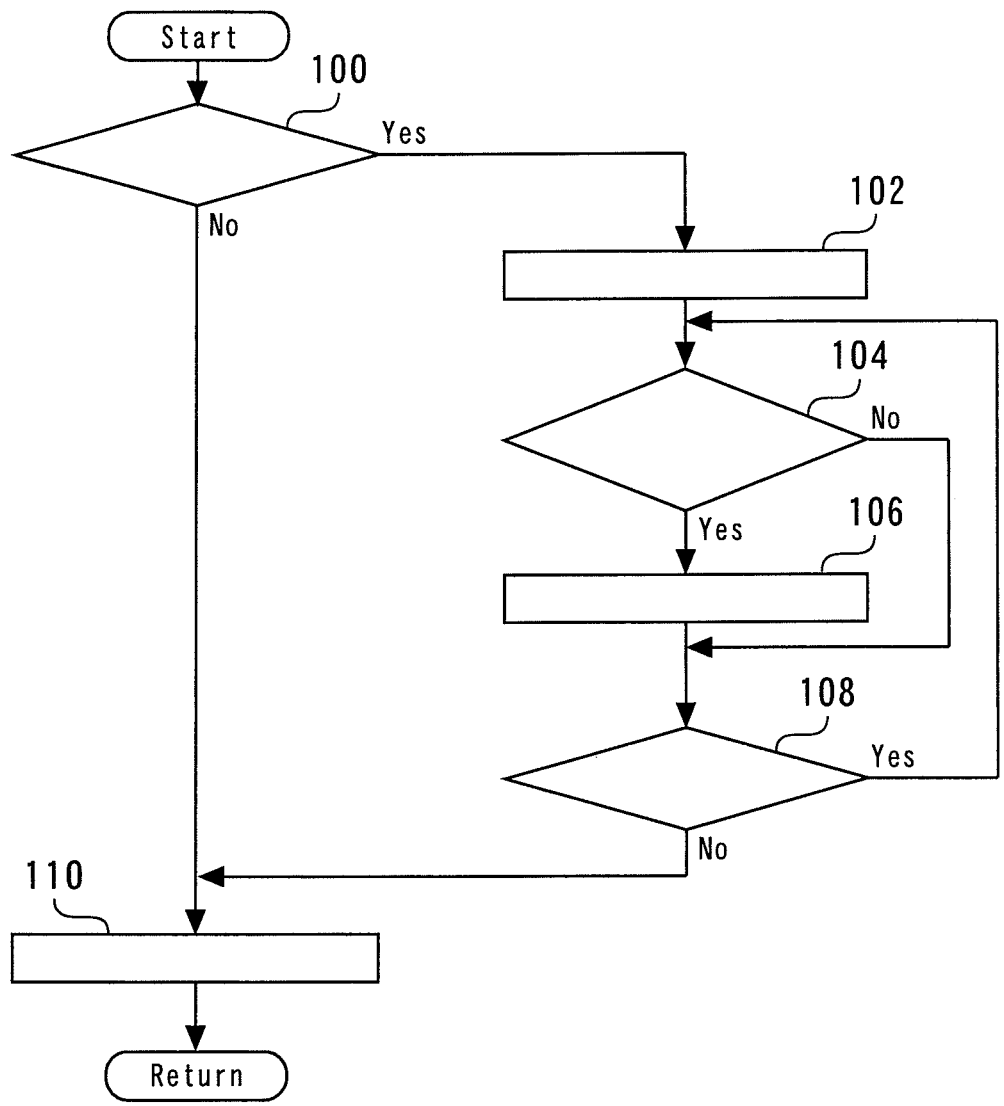
FIG. 4 is a flowchart of a control routine that is executed in the first embodiment of the present invention.

FIG. 4 is a flowchart of a control routine to be executed by the ECU 40 to realize the control at the time of a cold condition in the first embodiment of the present invention. In this connection, it is assumed that the external EGR control is executed at the time of a cold condition on the premise of the control of the present routine.

In the routine shown in FIG. 4, first, it is determined whether or not the internal combustion engine 10 is in a cold state (step 100). Specifically, in present step 100, it is determined that when the temperature of the main cooling water detected by the main cooling water temperature sensor 42 is lower than a predetermined value, the internal combustion engine 10 is in a cold state (that is, during warm up).

If it is determined in aforementioned step 100 that the internal combustion engine 10 is in a cold state, the circulation of the sub cooling water is stopped (step 102). Specifically, a state in which the drive of the sub water pump 34 is stopped is established, and a state in which the flow rate control valve 38 is stopped is established.

Next, it is determined whether or not the temperature of the sub cooling water detected by the sub cooling water temperature sensor 44 is higher than a predetermined value (step 104). The predetermined value in present step 104 is a value that is set in advance as a threshold value that can judge whether or not the temperature of the sub cooling water in the vicinity of the first exhaust port 14a1 has increased excessively.

If it is determined in aforementioned step 104 that the temperature of the sub cooling water is higher than the aforementioned predetermined value, the circulation of the sub cooling water is executed (the stop of the circulation is released) (step 106). Specifically, the drive of the sub water cooling pump 34 is executed, and the flow rate control valve 38 is opened to a predetermined opening degree. It is noted that the opening degree of the flow rate control valve 38 may be changed based on the temperature of the sub cooling water. As the temperature of the sub cooling water increases, for example, the opening degree of the flow rate control valve 38 may be enlarged so that the temperature of the sub cooling water becomes equal to or lower than the aforementioned predetermined value.

If the processing of aforementioned step 106 is executed, or the determination result of aforementioned step 104 is negative, it is determined whether or not the internal combustion engine 10 is still in the cold state (step 108). As a result of that, it is determined that the internal combustion engine 10 is still in the cold state, the processing of or after aforementioned step 104 is executed repeatedly.

If, on the other hand, it is determined in aforementioned step 100 or 108 that the internal combustion engine 10 is not in a cold state, that is, it can be judged that the warm up of the internal combustion engine 10 is completed (or has been completed), a flow rate control of the sub cooling water at the normal operation is executed (step 110). Specifically, the drive of the sub water pump 34 is executed, and the opening degree of the flow rate control valve 38 is controlled to a predetermined opening degree in accordance with the operational state of the internal combustion engine 10.

According to the routine shown by FIG. 4 described so far, when the internal combustion engine 10 is in a cold state (during a cold condition), the circulation of the sub cooling water is stopped. This causes the cooling capacity of (the first exhaust port 14a1 of) the first exhaust passage 14a, which plays a role in the introduction of the EGR gas into the EGR passage 24, to be lower than the cooling capacity of (the second exhaust port 14b1 of) the remaining second exhaust passage 14b, when the external EGR control is executed during the cold condition. As a result, the wall surface temperature of the first exhaust port 14a1 can be increased promptly, and thus the temperature of the EGR gas that is flown into the EGR passage 24 from the first exhaust passage 14a can be increased, during the cold condition. This makes it possible to reduce the quantity of condensed water that is flown into the cylinder as a result of suppressing an occurrence of the condensed water from the EGR gas, and to therefore prevent the durability of the internal combustion engine 10 from being deteriorated by the condensed water that is flown into the cylinder. In this way, the system of the present embodiment can introduce the external EGR gas during the cold condition, while successfully suppressing the occurrence of the condensed water from the EGR gas. Further, the configuration of the present embodiment can continue the warm up of the cooling water (main cooling water) that flows through the internal combustion engine 10 by use of another cooling system using the main cooling water, while executing the control for the cold condition described above.

Figure 5:
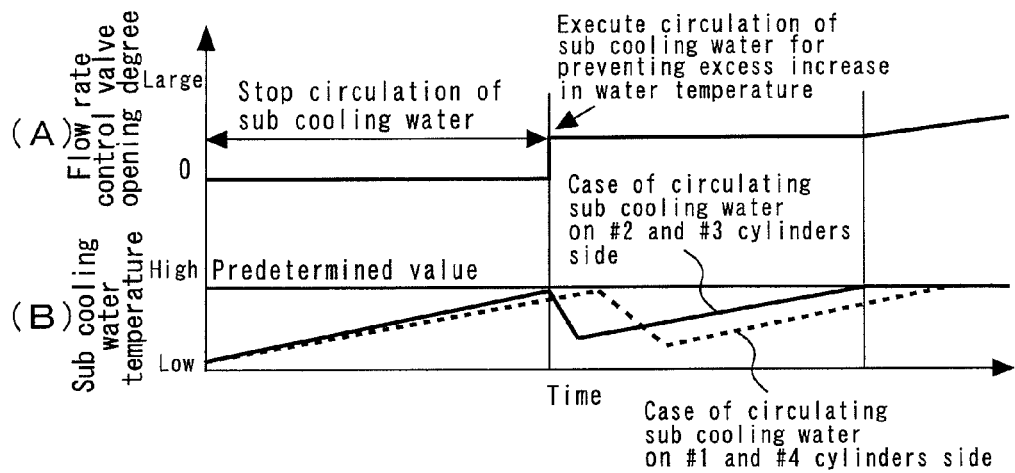
FIG. 5 is a time chart that represents changes in the opening degree of a flow rate control valve and the temperature of sub cooling water at the time of execution of the control shown in FIG. 4.
Figure 6:
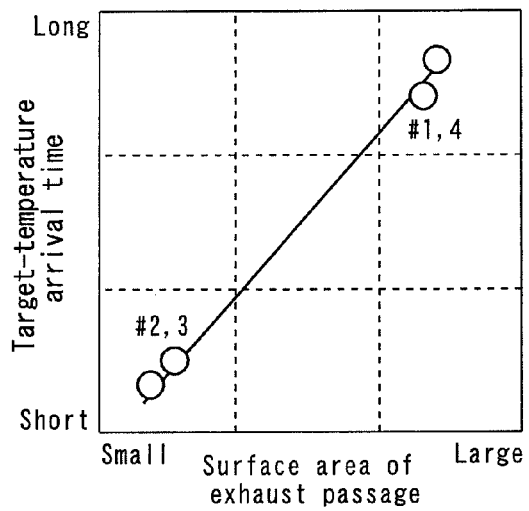
FIG. 6 is a diagram that represents a relation between a target-temperature arrival time of cooling water and a surface area of an exhaust passage.

FIG. 5 is a time chart that represents changes in the opening degree of the flow rate control valve 38 and the temperature of the sub cooling water at the time of execution of the control shown in aforementioned FIG. 4. Further, FIG. 6 is a diagram that represents a relation between a target-temperature arrival time of cooling water and a surface area of an exhaust passage. In this connection, the waveform represented by a solid line in FIG. 5 corresponds to a case of using the configuration shown in FIG. 1, that is, the configuration in which the sub cooling water cools the first exhaust port 14a1 on the first cylinder group (#2 and #3) side, while the waveform represented by a broken line in FIG. 5 corresponds to a case of using a configuration in which the sub cooling water cools the second exhaust port 14b1 on the second cylinder group (#1 and #4) side.

By executing the control of the routine shown in aforementioned FIG. 4, the temperature of the sub cooling water detected by the sub cooling water temperature sensor 44 at the time of a cold start increases with the time course as shown in FIG. 5, in a state in which the flow rate control valve 38 is closed. According to the routine shown in aforementioned FIG. 4, when the temperature of the sub cooling water has reached the aforementioned predetermined value after the circulation of the sub cooling water is stopped as shown in FIG. 5(B), the circulation of the sub cooling water is executed by opening the flow rate control valve 38 as shown in FIG. 5(A) (besides execution of a drive of the sub water pump 34). This makes it possible to prevent the temperature of the sub cooling water from exceeding the aforementioned predetermined value and increasing excessively as shown in FIG. 5(B). It is noted that since FIG. 5 takes, as a target, a cold condition when the internal combustion engine 10 is warmed up with the time course, the temperature of the sub cooling water tends to basically increase with progression of warm up of the internal combustion engine 10.

Moreover, as described above, the internal combustion engine 10 of the present embodiment is set such that the surface area of the first exhaust passage 14a connected to the EGR passage 24 is smaller than that of the second exhaust passage 14b. In a case in which the configuration (solid line) is used in which the sub cooling water cools the first exhaust passage 14a as in the present embodiment, the above described setting can promote an increase in temperature of the sub cooling water as shown in FIG. 5(B), as compared with the configuration (broken line) in which the sub cooling water cools the second exhaust passage 14b having relatively large surface area. In fact, as the surface area of an exhaust passage is smaller, a time at which the temperature of cooling water for cooling the exhaust passage reaches a predetermined target temperature becomes shorter as shown in FIG. 6. Having the above described setting makes it possible to achieve a hardware configuration capable of favorably suppressing an occurrence of condensed water from EGR gas that is flown into the EGR passage 24 from the first exhaust passage 14a side. Describing more specifically, in the present embodiment, the technique that stops the circulation of the sub cooling water during the cold condition is used, and therefore, an increase in temperature of the sub cooling water can be promoted that remains around the first exhaust port 14a1 because the above described setting concerning the surface area is adopted. In contrast to such technique, the setting concerning the surface area is effective for promoting an increase in temperature of the sub cooling water in a case in which a technique that reduces the circulation flow rate of the sub cooling water with respect to the circulation flow rate of the main cooling water during the cold condition (an alternative technique described later) is adopted.

In the first embodiment, which has been described above, the arrangement is adopted so that during a cold condition, the cooling capacity of the first exhaust passage 14a is lower than the cooling capacity of the remaining second exhaust passage 14b by stopping the circulation of the sub cooling water basically (i.e. as far as the temperature of the sub cooling water does not increase excessively). However, the concrete technique by which the exhaust cooling adjustment means in the present invention reduces the cooling capacity of the first exhaust passage with respect to the cooling capacity of the remaining second exhaust passage is not limited to the one that stops the circulation of the sub cooling water. Specifically, during the cold condition, a technique which reduces the circulation flow rate of the sub cooling water that cools the first exhaust passage 14a with respect to the circulation flow rate of the main cooling water that cools the second exhaust passage 14b (hereinafter, referred to as an "alternative technique" for differentiating from the technique in the first embodiment), for example, may be used. Moreover, this alternative technique is not limited to the one that controls the flow rate so as to cause a difference in circulation flow rate between the sub cooling water and main cooling water as described above. That is to say, the alternative technique may be realized by being configured so as to introduce EGR gas into the EGR passage 24 from the first exhaust passage 14a on the sub cooling water side during the cold condition, in the configuration, as with the hardware configuration of the above described internal combustion engine 10, having two types of cooling systems in which the circulation flow rate of the sub cooling water is smaller than the circulation flow rate of the main cooling water. Further, in the case of using the aforementioned alternative technique as well, the water quantity of the sub cooling water may be adjusted so that the temperature of the sub cooling water that cools the first exhaust passage 14a does not increase excessively, as in that of the first embodiment described above.

Further, the following setting in the above described first embodiment, that is, the setting of reducing the surface area of the first exhaust passage 14a connected with the EGR passage 24 with respect to the surface area of the second exhaust passage 14b, is suitable to promote an increase in temperature of the sub cooling water during the cold condition, in the case of using the aforementioned alternative technique that allows the circulation of the sub cooling water that cools the first exhaust passage 14a not to be stopped. Having this setting can successfully suppress an occurrence of the condensed water from EGR gas.

Furthermore, in the first embodiment, which has been described above, the description has been made taking an example of the internal combustion engine 10 that includes the first cylinder group made up of two cylinders (#2 and #3) as the first cylinder sub set and the second cylinder group made up of two cylinders (#1 and #4) as the second cylinder sub set. However, the first cylinder sub set and the second cylinder sub set in the present invention is not limited to the aforementioned example. Specifically, the first cylinder sub set may be one cylinder, or a plurality of cylinders made up of three or more cylinders, and as well, the second cylinder sub set may be one cylinder, or a plurality of cylinders made up of three or more cylinders It is noted that in the first embodiment, which has been described above, a sub cooling system including the sub cooling water passage 32, the sub water pump 34, the sub radiator 36 and the flow rate control valve 38 corresponds to the "first exhaust cooling means" according to the first aspect of the present invention, a main cooling system including the main cooling water passage 30 and the main water pump and main radiator, which are not shown, corresponds to the "second exhaust cooling means" according to the first aspect of the present invention. In addition, the ECU 40 controls the quantity of EGR gas by controlling the opening degree of the EGR valve 26, whereby the "EGR control means" according to the first aspect of the present invention is realized, and the ECU 40 executes the processing of aforementioned step 102 when the determination result of aforementioned 100 is positive, whereby the "exhaust cooling adjustment means" according to the first aspect of the present invention is realized.

Further, in the first embodiment, which has been described above, the sub cooling water corresponds to the "first cooling water" according to the second, third or seventh aspect of the present invention, and the mail cooling water corresponds to the "second cooling water" according to the third aspect of the present invention. Further, in the first embodiment, which has been described above, the ECU 40 executes the processing of aforementioned step 106 when the determination result of aforementioned step 104 is positive, whereby the "water temperature excess increase suppression means" according to the fourth aspect of the present invention is realized.

DESCRIPTION OF SYMBOLS 10 internal combustion engine
12 intake passage
12a surge tank
14 exhaust passage 14a first exhaust passage
14a1 first exhaust port
14b second exhaust passage
14b1 second exhaust port
14c confluent exhaust passage
16 air flow meter
18 twin entry type turbo supercharger
18a compressor
18b turbine
20 water-cooled intercooler
22 throttle valve
24 EGR (Exhaust Gas Recirculation) passage
26 EGR valve
28 cylinder head
30 main cooling water passage
32 sub cooling water passage
34 sub water pump
36 sub radiator
38 flow rate control valve
40 ECU (Electronic Control Unit)
42 main cooling water temperature sensor
44 sub cooling water temperature sensor
46 fuel injection valve
48 ignition plug

The invention claimed is:

1. A control apparatus for an internal combustion engine, comprising:
a first exhaust passage through which exhaust gas exhausted from a first cylinder subset made up of one or a plurality of cylinders flows;
a second exhaust passage through which exhaust gas exhausted from a second cylinder subset made up of one or a plurality of cylinders flows;
first exhaust cooling means which cools the first exhaust passage;
second exhaust cooling means which is provided separately from the first exhaust cooling means and cools the second exhaust passage;
an EGR passage which connects the first exhaust passage with an intake passage;
EGR control means which controls an EGR gas quantity introduced into the intake passage via the EGR passage; and
exhaust cooling adjustment means which when the EGR gas is introduced into the intake passage at a time of a cold condition of the internal combustion engine, reduces cooling capacity of the first exhaust passage by the first exhaust cooling means with respect to cooling capacity of the second exhaust passage by the second exhaust cooling means.

2. The control apparatus for an internal combustion engine according to claim 1,
wherein the first exhaust cooling means is water-cooled cooling means for cooling the first exhaust passage by use of circulation of first cooling water, and
wherein the exhaust cooling adjustment means is means for stopping the circulation of the first cooling water by the first exhaust cooling means.

3. The control apparatus for an internal combustion engine according to claim 1,
wherein the first exhaust cooling means is water-cooled cooling means for cooling the first exhaust passage by use of circulation of first cooling water,
wherein the second exhaust cooling means is water-cooled cooling means for cooling the second exhaust passage by use of circulation of second cooling water,
wherein the exhaust cooling adjustment means is means for reducing a circulation flow rate of the first cooling water with respect to a circulation flow rate of the second cooling water.

4. The control apparatus for an internal combustion engine according to claim 2, further comprising:
water temperature excess increase suppression means which adjusts a circulation flow rate of the first cooling water such that a temperature of the first cooling water does not increase excessively in a case in which the EGR gas is introduced into the intake passage during the cold condition of the internal combustion engine.

5. The control apparatus for an internal combustion engine according to claim 1,
wherein a surface area of the first exhaust passage is set larger than a surface area of the second exhaust passage.

6. The control apparatus for an internal combustion engine according to claim 1, further comprising:
twin entry type turbo supercharger which has a turbine operating by exhaust energy of the internal combustion engine, and is configured such that the exhaust gas from the first cylinder sub set and the exhaust gas from the second cylinder sub set are separately led to the turbine by means of the first exhaust passage and the second exhaust passage.

7. The control apparatus for an internal combustion engine according to claim 1,
wherein the first exhaust cooling means is water-cooled cooling means that cools the first exhaust passage by use of the circulation of the first cooling water, and
wherein the first cooling water is for cooling a water-cooled intercooler.

8. A control apparatus for an internal combustion engine, comprising:
a first exhaust passage through which exhaust gas exhausted from a first cylinder subset made up of one or a plurality of cylinders flows;
a second exhaust passage through which exhaust gas exhausted from a second cylinder subset made up of one or a plurality of cylinders flows;
a first exhaust cooler which cools the first exhaust passage;
a second exhaust cooler which is provided separately from the first exhaust cooler and cools the second exhaust passage;
an EGR passage which connects the first exhaust passage with an intake passage; and
a controller that is programmed to:
control an EGR gas quantity introduced into the intake passage via the EGR passage; and
when the EGR gas is introduced into the intake passage at a time of a cold condition of the internal combustion engine, reduce cooling capacity of the first exhaust passage by the first exhaust cooler with respect to cooling capacity of the second exhaust passage by the second exhaust cooler.

* * * * *